(12) United States Patent
Gopalakrishnan et al.

(10) Patent No.: US 9,523,972 B2
(45) Date of Patent: Dec. 20, 2016

(54) METHOD FOR DISTRIBUTED WAVEFORM RECORDING IN A POWER DISTRIBUTION SYSTEM

(71) Applicant: ABB RESEARCH LTD, Zurich (CH)

(72) Inventors: Vivek Gopalakrishnan, Vellore (IN); Sasi Kumar S. R., Salem (IN); Bernhard Deck, Weilheim (DE)

(73) Assignee: ABB Schweiz AG, Baden (CH)

( * ) Notice: Subject to any disclaimer, the term of this patent is extended or adjusted under 35 U.S.C. 154(b) by 385 days.

(21) Appl. No.: 14/142,196

(22) Filed: Dec. 27, 2013

(65) Prior Publication Data

US 2014/0136002 A1 May 15, 2014

Related U.S. Application Data

(63) Continuation of application No. PCT/IB2012/001301, filed on Jun. 29, 2012.

(51) Int. Cl.
G05B 15/02 (2006.01)
H02H 7/26 (2006.01)
H04Q 9/00 (2006.01)

(52) U.S. Cl.
CPC .......... *G05B 15/02* (2013.01); *H02H 7/26* (2013.01); *H04Q 9/00* (2013.01); *H04Q 2209/20* (2013.01); *H04Q 2209/60* (2013.01)

(58) Field of Classification Search
CPC ....................................... G05B 15/02

USPC ........................................ 700/286; 340/531
See application file for complete search history.

(56) References Cited

U.S. PATENT DOCUMENTS

| 4,110,684 A | 8/1978 | Gale |
| 2002/0145517 A1 | 10/2002 | Papallo et al. |
| 2008/0234957 A1 | 9/2008 | Banhegyesi et al. |

OTHER PUBLICATIONS

International Search Report (PCT/ISA/210) mailed on Dec. 17, 2012, by the Indian Patent Office as the International Searching Authority for International Application No. PCT/IB2012/001301.

*Primary Examiner* — Tejal Gami
(74) *Attorney, Agent, or Firm* — Barnes & Thornburg LLP

(57) ABSTRACT

An exemplary method and apparatus are directed to distributed waveform recording for fault monitoring and analysis of a fault condition in a power distribution system. One or more instrument transformers along with merging units and a plurality of Intelligent Electronic Devices (IEDs) distributed in a plurality of hierarchical levels. The distributed waveform recording corresponds to a fault event at different levels in the power distribution system data is carried out by at least two devices configured to detect an event for recording and perform waveform recording. The data used for waveform recording and the data for detection of the event are based on a single stream of the sampled measured value data and are thereby are time synchronized.

12 Claims, 5 Drawing Sheets

METHOD FOR DISTRIBUTED WAVEFORM RECORDING IN A POWER DISTRIBUTION SYSTEM

RELATED APPLICATION

This application claims priority under 35 U.S.C. 120 to International application PCT/IB2012/001301 filed on Jun. 29 2012, designating the U.S., and claiming priority to Indian application 2232/CHE/2011 filed in India on Jun. 30 2011. The content of each prior application is hereby incorporated by reference in its entirety.

FIELD

The present disclosure relates to a power distribution system and particularly to a method and apparatus of distributed waveform recording for fault monitoring and analysis of fault condition.

BACKGROUND INFORMATION

An electrical or power substation includes electricity transmission and distribution systems where high and low voltages are stepped down or up, respectively using transformers. Electric power may flow through several substations between generating plant and consumer or load, and may be transformed in voltage in several steps.

Known substations can include a plurality of power and distribution transformers, cabling, switching, reactive power and grounding equipment. The equipment should be protected against power system anomalies can using Intelligent Electronic Devices (IEDs). Currently different types of known IEDs are used in a substation for functions related to protection, control, monitoring and metering. The IEDs are microprocessor-based equipment associated with power distribution system equipment, such as circuit breakers, generators, transformers, power lines, power cables, reactors, motors, capacitor banks, or other suitable components as desired. The IEDs receive primary power distribution system information such as voltage and current from sensors to perform various protection and monitoring functions. Manual and Automatic control command functions like closing and opening of switching equipment (circuit breakers and disconnectors), or raise/lower voltage levels in order to maintain the desired voltage levels. Common types of IEDs include protective relaying devices, load tap changer controllers, circuit breaker controllers, recloser controllers, voltage regulators, DFRs (Digital Fault Recorders), DSRs (Digital Surge Recorders) and programmable logic controllers (PLCs) etc.

Thus a single unit can perform several protections, metering, monitoring, and control functions concurrently.

The IEC61850 standard is an open communication standard from International Electrotechnical Commission (IEC) that advocates interoperability amongst Intelligent Electronic Devices (IEDs) from various manufacturers using common engineering models, data formats and communication protocol. Recent IEDs are therefore designed to support the IEC61850 standard for substation automation, which provides interoperability and advanced communications capabilities like GOOSE (Generic Object Oriented Substation Event) and MMS (Manufacturing Message System) communication profiles.

In the current power distribution systems, the causes for power distribution system reliability conditions, such as the fault conditions, can be analyzed through waveform records stored in Intelligent Electronic Devices (IEDs). Ideally, waveform records should be stored by IEDs during pre-fault and post fault conditions. This means that IEDs should have a data storage mechanism, and means to continuously monitor field data and trigger the waveform storage once the fault is detected. The recorded data represents the condition before and during occurrence of the fault for analyzing the conditions that led to the fault. Hence, the waveform recording is an elemental component of a substation automation system.

The current power distribution systems, however, are not able to perform waveform recording in a desired manner due to various limitations. The IEDs that record the waveform data could either be a protection/control IED that performs protection and control related actions as its primary function and recording as a secondary function, or a dedicated IED performing only the waveform recording functionality. When the IED is used for waveform recording, as a secondary function, in known implementations the IED can have less waveform storage space compared to a dedicated waveform recorder IED. Due to memory limitations, duration of the pre-fault and post-fault records in the waveform may get restricted. Besides that, the protection devices most often operate at lower sampling rates leading to a low resolution waveform recording. This condition can cause limitations in root cause analysis and create dependencies on the dedicated waveform recorder IED which is comparatively a costly solution.

In some known power distribution systems, the waveform recording function present in protection IEDs can sample from 4 to 128 samples/cycle, the sampling rate can be limited because of input filters providing filtered quantities for main protection and control functions. Dedicated DFRs (with or without process bus input) and standalone DFRs can be used for higher sampling rates such as, at 64 to 356 samples/cycle. Thus, the recording device may have limitations on its sampling capabilities. Further, the instrument transformers in a substation are hardwired with the DFRs, which are time synchronized with a time server at different synchronization resolutions. Thus, the fault waveforms recorded by these substation automation devices in a distributed manner may result in timing inaccuracies.

There are different conditions that occur within the power distribution system which demand high sampling rates of digitized data for a shorter duration. Moreover, conditions can arise where lower sampling rates of digitized voltage and/or current data are used for a longer duration. Under these conditions, it can be desirable to have flexibility in a recording device so that it can support both high sampling rates of digitized voltage and/or current data and have a capacity to store these data for a long duration.

With multiple IEDs in the system, the available resource utilization can be improved to support waveform recording at desired sampling rates and for desired time durations instead of using a dedicated DFR which may have a time synchronization problem when hardwired with the instrument transformer and time server for sampled measured value and time data acquisition, respectively. This configuration can result in deviations in the timing information of disturbance data recorder in distributed devices. With a Merging Unit present in the process bus, the usage of dedicated DFRs can be expensive and also reduce the availability of the overall system as it contributes to an increase in the number of automation elements resulting in reduced Mean Time Between Failure (MTBF).

A flexible method for recording waveforms should include accurate time synchronization and efficient use of the resources in the power distribution system.

SUMMARY

An exemplary distributed waveform recording method for event monitoring in a power distribution system is disclosed, wherein the power distribution system includes a plurality of devices communicatively connected in a plurality of hierarchical levels within the power distribution system, the plurality of devices including a plurality of instrument transformers along with merging units deployed as process level devices connected on a process bus within the plurality of hierarchical levels, a plurality of Intelligent Electronic Devices (IEDs) deployed as bay level devices connected on a station bus and on the process bus within the plurality of hierarchical levels, and a plurality of client computers deployed as station level devices connected on the station bus within the plurality of hierarchical levels, the distributed waveform recording method comprising: a) communicating, via at least one process level device, sampled measured value data on the process bus; b) subscribing to and processing, via one or more configured IEDs, the sampled measured value data communicated by the at least one process level device to identify an event; c) issuing, via at least one IED from said one or more configured IEDs and based on identification of an event or at least one client computer from the plurality of client computers, a waveform recording trigger to one or more devices among the plurality of devices in the power distribution system; and d) performing waveform recording, via said one or more devices among the plurality of devices in the power distribution system, based on the issued wave form recording trigger, wherein the data for the waveform recording performed by the said one or more devices is derived from the sampled measured value data communicated by said at least one process level device.

An exemplary apparatus for waveform recording based on a waveform trigger and communicatively connectable in any level within a plurality of hierarchical levels of a power distribution system having one or more devices communicatively connected in various levels of other hierarchical levels within the plurality of hierarchical levels is disclosed, the apparatus comprising: a processing module that detects the waveform recording trigger from data processed internally or by the one or more devices within the plurality of hierarchical levels of the power distribution system; and a waveform recording module that performs waveform recording based on the detected waveform recording trigger, wherein the data for waveform recording processed internally is sourced from a single stream of sampled measured value data.

A power distributed system is disclosed, comprising: a plurality of devices communicatively connected in a plurality of hierarchical levels; and at least two devices among the plurality of devices configured to detect an event for waveform recording and perform waveform recording based on the detected event, wherein said at least two participating devices obtain data for the detection of the event for waveform recording and data for performing waveform recording from a single stream of sampled measured value data.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
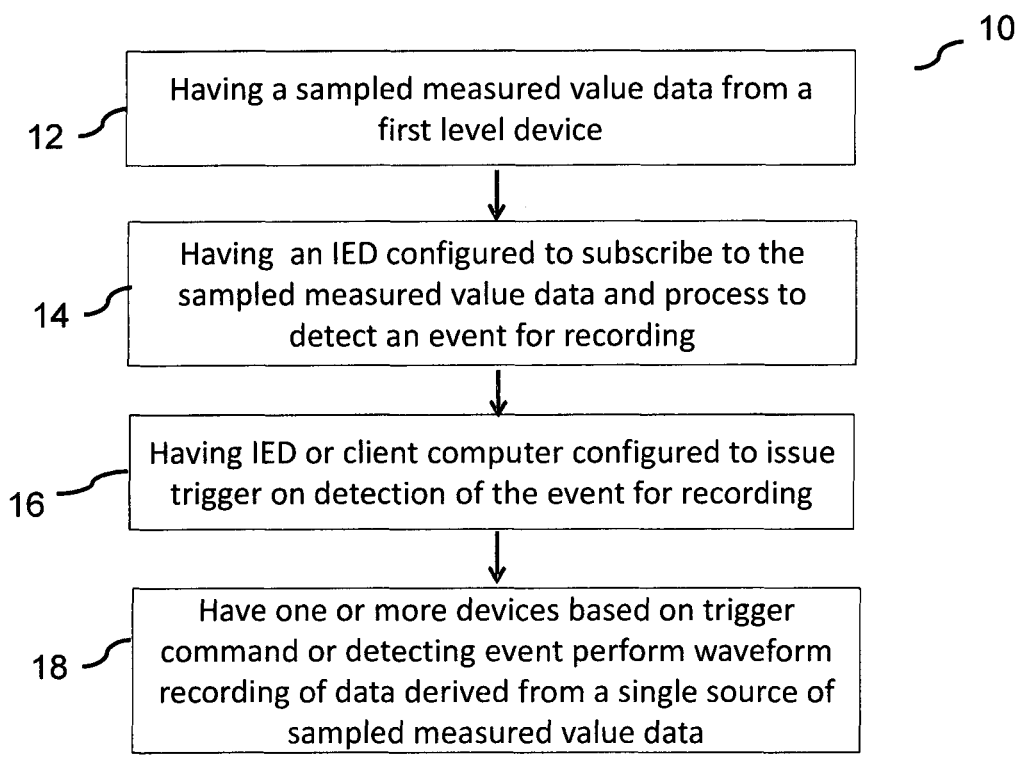
FIG. 1 is a flowchart for a method of distributed waveform recording for fault monitoring in a power distribution system, according to an exemplary embodiment of the present disclosure.

Exemplary embodiments of the present disclosure include a distributed waveform recording method for fault monitoring in a power distribution system, where the power distribution system includes one or more Electronic Voltage/Current transformers and a plurality of Intelligent Electronic Devices (IEDs) distributed in a plurality of hierarchical levels. The method includes recording different waveforms corresponding to a fault event at different levels in the power distribution system, where each of the waveforms is recorded at a sampling rate corresponding to a level of a waveform recording device during a specified time period based, the data for the waveform recording is based on a single sample stream from the synchronized Sampled Measured Value data source, for example Merging Unit, and where the different waveforms are synchronized based on a network time synchronization for the power distribution system.

Exemplary methods disclosed herein can be based on generating a waveform trigger by any of the participating/subscribing devices configured for detecting the event, and that communicate the waveform trigger to one or more devices among a plurality of hierarchical levels within the power distribution system to participate for waveform recording.

Exemplary embodiments of the present disclosure are also directed to an apparatus configured for waveform recording based on waveform recording trigger. The apparatus can be arranged in any of the plurality of hierarchical levels within the power distribution system and have a processing module that detects a waveform recording trigger from the data processed by it or from a communication received from any other devices within the plurality of hierarchical levels of the power distribution system. The apparatus can also have a waveform recording module that performs waveform recording based on the detected waveform recording trigger. The data for waveform recording for the apparatus is sourced from a single stream of sampled measured value data.

Other exemplary embodiments disclosed herein are directed to a power distribution system that includes one or more Electronic Voltage/Current transformers and a plurality of Intelligent Electronic Devices (IEDs), and further includes a merging unit for enabling a distributed waveform recording for recording different waveforms corresponding to a fault event at different hierarchical levels in the power distribution system, where each of the waveforms is recorded at a sampling rate based on a hierarchical level at which where the recording device is connected. The data for waveform recording and event detection can be based on a single sample stream from the Sampled Measured Value data source, for example, Merging Unit, and the waveforms can be synchronized based on network time synchronization for the power distribution system.

An exemplary power distribution system automation, described in the present disclosure automation system, power distribution system network as described in the present disclosure allows different equipment and components in the power distribution system to communicate with each other, receive operator instructions, and provide key alerts, message and signals for managing the power distribution system.

It shall be appreciated by those skilled in the art that with the introduction of the communication standard IEC61850, it can be possible to collect and log data in different hierarchical levels of the power distribution system architecture by using communication between IEDs. Exemplary embodiments disclosed herein use this communication scheme to trigger fault recording and collection of data associated with fault conditions at multiple hierarchical levels of the power distribution system architecture, thereby enabling numerous applications such as localized trend analyses, simulated experimental studies (for e.g., response studies on fault), and wide area monitoring and fault analyses resulting in a reliable power network.

An exemplary merging unit also referred herein as MU encompasses an IED providing a digital interface to Electronic Voltage/Current Sensor (e.g., instrument transformer) that transmits sampled measured values on to Ethernet according to IEC 61850-9-2 and/or IEC 61850-9-2 LE (Light Edition).

According to exemplary embodiments described herein, a digital input is a hardware input channel in the power distribution system devices/IEDs that provides for power distribution system equipment status monitoring.

A GOOSE-Generic object oriented substation events as provided in the present disclosure, is a communication protocol according to IEC 61850 for communication between IEDs in the substation.

Exemplary embodiments described herein can include a Digital Fault Recorder (DFR) or event recorder that is used in the power distribution system to record instantaneous values (waveforms) of current and voltages and digital status of power system equipment for a given period of time. The event recorder can be provided in the power distribution system to record events (digitized) with timestamps. These recorders can also be configured to recognize events/faults by receiving a communication or signal on the input channel because of a condition in the system, such as a trigger by an operator to record events.

Exemplary first level device(s), as described herein, are process level device(s) connected to a process bus in the substation automation hierarchy. For example, a process level device can be a merging unit or an electronic instrument transformer (e.g., a transformer having digital interface for communication of measured values). The electronic instrument transformer can be connected to a merging unit to communicate sampled measured values. The first level device processes a high number of samples (e.g., high number of samples per second); while a minimal amount of data processing can be performed at the first level, for example in an exemplary embodiment digital filtering.

According to exemplary embodiments of the present disclosure a second level device, as disclosed herein, is a bay level device connected to a process bus and to a station bus (the level corresponds to a bay level) in the substation automation hierarchy. The second level device processes a relatively lesser number of samples (e.g., lesser number of samples per second) as composed to the first level device. The second level device is for example an IEC 61850 compliant IED, and receives a sampled measured value stream from a first level device. A moderate amount of processing can be performed on the data which includes RMS computation or digital filtering.

Other level devices as provided in the present disclosure are devices used in a level other than the process and bay (second) levels. The other level device can be connected for example to a station bus (first) in the substation automation hierarchy, and arranged in at least a third level device or lower level device, which can process a large amount of data and record data for a very long duration of time.

Waveforms as described in accordance with exemplary embodiments of the present disclosure refer to waveforms representing any process data relating to the power distribution system including but not limited to voltage and current data.

The method for multi-level waveform recording, also referred to herein as a distributed waveform recording method, makes use of the communication networks in a distribution system based on IEC 61850 for recording waveforms at different resolutions from different levels of power distribution system, all synchronized based on the power distribution system network time synchronization. Further, the method can be used for recording waveforms for one or more phases.

FIG. 1 is a flowchart for a method of distributed waveform recording for fault monitoring in a power distribution system, according to an exemplary embodiment of the present disclosure. With respect to FIG. 1, the power distribution system includes one or more transformers and a plurality of Intelligent Electronic Devices (IEDs) distributed in a plurality of hierarchy levels in the power distribution system. In step 12, a first level device (e.g., process level device) communicates sampled measured value data. The communicated sampled measured value data are subscribed by one or more IEDs and at least one IED is capable of identifying an event for waveform recording (step 14). The at least one IED based on an identified event or a client computer from station bus based on operator intervention issues a waveform recording trigger (step 16) for recording different waveforms corresponding to the event (e.g., fault event) at different levels in the power distribution system. Each of the waveforms is recorded by one or more devices in the power distribution system at a different sampling rate from other devices depending on the hierarchical level and the configuration of the device (step 18) based on the issued waveform trigger. These different waveforms are derived from synchronized sampled measured values based on network time synchronization for the power distribution system by the first level device.

In accordance with an exemplary embodiment disclosed herein, methods exemplary can include initiating a triggering event for recording each of the plurality of waveforms, that is done through a suitable triggering method by any device in the power distribution system that is capable of identifying an event (e.g. fault) or react to operator intervention (e.g., having a client computer issue a waveform recording trigger through an operator). The client computer can also include a device that identifies an event through processing of data/information that it receives.

According to an exemplary embodiment of the present disclosure, the waveform recording functionality in any IED can be triggered by but not limited to the communication (any control command, monitoring status of any binary input) from the peer and/or master devices (e.g., MMS or GOOSE or any other communication protocol based trigger), Monitoring Digital Input/output status/hardwired signals triggered by the peer IED or the process equipment, and Measured values (e.g., threshold crossing, dead band crossing).

In another exemplary embodiment of the present disclosure, the merging unit sends sample measured value (IEC61850-9-2) message to the subscribing IEDs. Here, the merging unit is the primary source of information for all subscribing IEDs. The subscribing IEDs use the data for protection and control, revenue metering, waveform recording, or any other suitable analyses as desired. The merging unit can also support binary inputs and GOOSE which can be used to monitor any status information from the subscribing IEDs. The merging unit receives, for example, the Ethernet frames from the multiple interface units from multiple IEDs at multiple levels in the power distribution system automation hierarchy, and stores these in its buffer so that the data can be used for detection of a fault trigger condition or recording when a trigger condition is met. The triggering algorithm can then be initiated on the detection of the trigger event by any subscribing IED which initiates the waveform recording function in merging unit or/and one or more IEDs in the power distribution system.

The samples or waveforms can be recorded and corresponding data generated in a COMTRADE (COMmon format for Transient Data Exchange for power distribution systems) format, for example, and stored in memory for further processing and analysis as desired.

One or more of the merging units can be configured as first level devices that generate digitized process data, the merging units can be distributed across the power distribution system and be synchronized to each other with a high accuracy (e.g., a few microseconds). In one exemplary implementation, the first level device (e.g., a process bus device such as Merging Unit or electronics of transformers such as an Electronic Current/Voltage Transformer (ECT/EVT)) acquires the instrument transformer data at a high sampling rate, for example 256 samples/cycle. The first level device (for example MU) also sends the data as per IEC61850-9-2 (either at the high rate, 256 samples/cycle or low rate, e.g., 80 or 32 samples/cycle) to a second level device (say protection/control IED) which further processes the data. The second level IED can determine whether to send the raw sample data or processed data (like RMS) to the next level IED using GOOSE/MMS/slow SV (e.g., samples value), through a centralized protection IED/RTU (Remote Terminal Unit)/a client computer; or to record the waveform itself. Further, the second level device can store either raw sample data or processed data which is arrived by doing some calculations on the raw sample data.

The recording device for example the IED, can execute the triggering algorithm, records, the samples, and generate the COMTRADE or other suitable format files that are stored in its memory for further processing and analysis as desired. Communication profiles such as IEC 61850-9-2, 9-2 LE, slow SV and 61850-8-1 (GOOSE/MMS), or other suitable profiles as desired can be used, to pass the information among various levels of devices. The first and second level devices can perform the coordinated data recording by virtue of the communication between them. For example, when the second level device, such as a protection IEDs, detects an abnormality, it can trigger the first level device, such as an MU, to record the processed data, where the MU does not run a protection algorithm (including data processing algorithm or event detection algorithm), but captures the process data continuously.

In accordance with another exemplary embodiment, one or more electronic transformers can be used as the first level device, and for another first level device, merging units can be used for recording the fault waveform, which is based on the sampled measured value from the transformer electronics interface.

In yet another exemplary embodiment disclosed herein, the one or more transformers can be used as a first level device, and the merging unit can be used as a another first level device for recording the fault waveform, and further the IEDs in the station bus of substation automation hierarchy can be, second level devices that also record the waveforms based on the sampled measured value from electronic transformer. A Merging Unit can be configured for coordinating the communication between the first and other level devices in the power distribution system.

According to another exemplary embodiment of the present disclosure, the exemplary method can include step 16 for generating data corresponding to the different waveforms in a suitable format file for storage and retrieval. In addition a step 18 can include processing the data for at least one of a localized trend analysis, wide area monitoring and fault analysis. Following such processing, further steps (not shown) can include displaying the data and the analysis results, and communicating the same to external devices.

Figure 2:
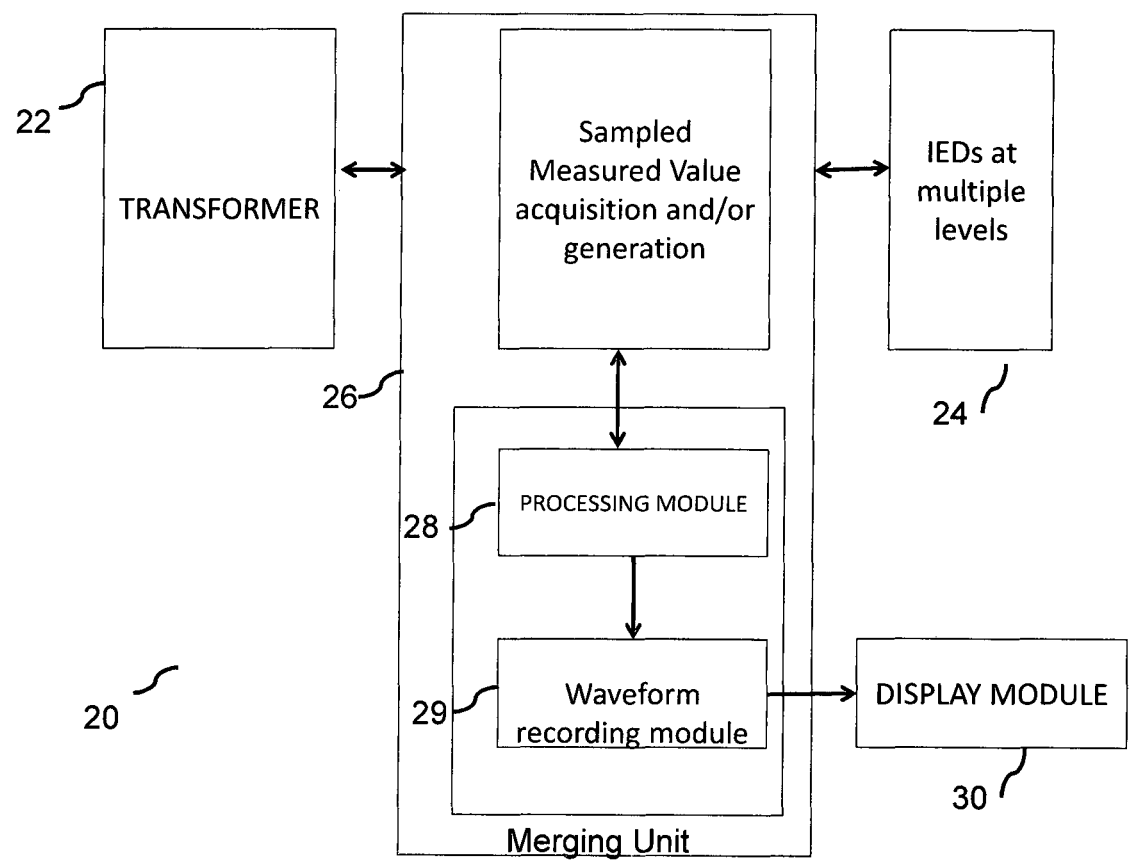
FIG. 2 is a block diagram of a power distribution system with a merging unit in accordance with an exemplary embodiment of the present disclosure.

FIG. 2 is a block diagram of a power distribution system with a merging unit in accordance with an exemplary embodiment of the present disclosure. As shown in FIG. 2 the power distribution system 20 can include one or more transformers 22, a merging unit 26 and multiple Intelligent Electronic Devices (IEDs) 24 at various levels in the hierarchy. The merging unit 26 as described herein is used in distributed waveform recording for recording different waveforms corresponding to a fault event detected by IEDs at different levels in the power distribution system. One or more IEDs 24 can be involved in waveform recording. Each of the plurality of waveforms is recorded in each device at a different sampling rate from the others based on the hierarchical level to which the device is associated when the recording is carried out. The recording of different waveforms is performed through synchronized sampled measured value, which is based on network time synchronization for the power distribution system.

The recording device (MU or IED) includes a processing module 28 configured for detecting the event to be recorded (e.g., by processing of the data subscribed by it or by recognizing the waveform recording trigger generated by any other device which is capable to communicate with it) and a waveform processing module 29 for waveform recording (e.g., generating data corresponding to the plurality of waveforms in a format file for storage and retrieval). The processing module can be configured for processing the data for at least one of a localized trend analysis and wide area monitoring and fault analysis which analyses can be displayed by a suitable display device 30 such as its human machine interface (HMI) or a monitor of a computer or a mobile device.

Figure 3:
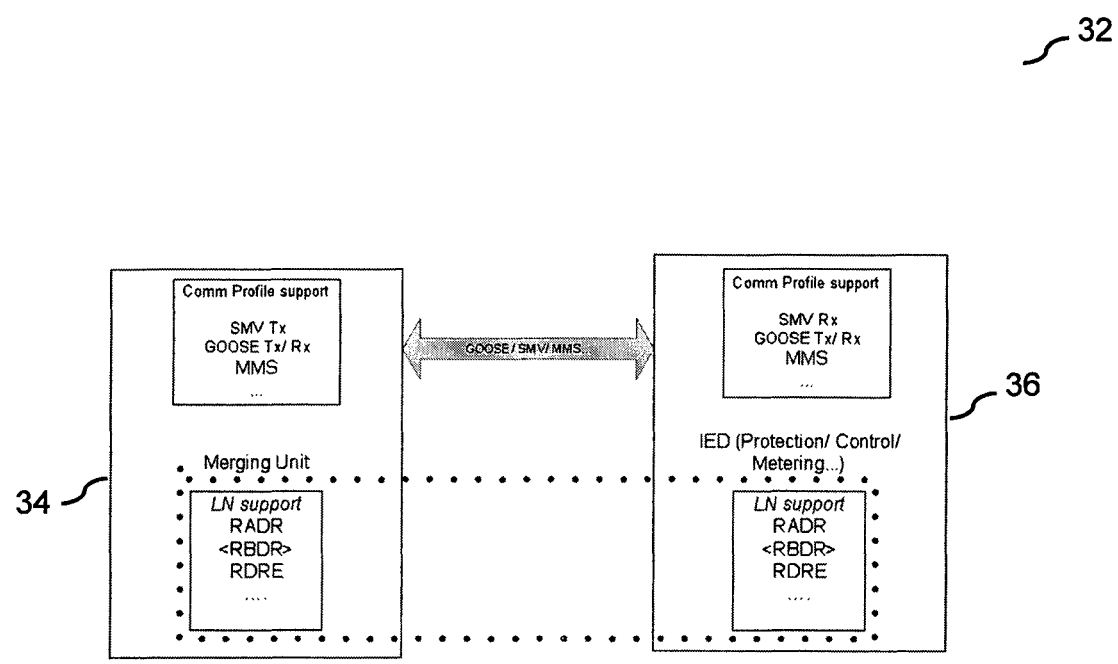
FIG. 3 illustrates a first arrangement of the power distribution system of FIG. 1 where the merging unit is a first level device in accordance with an exemplary embodiment of the present disclosure.

FIG. 3 illustrates a first arrangement of the power distribution system of FIG. 1 where the merging unit is a first level device in accordance with an exemplary embodiment of the present disclosure. As shown in FIG. 3, the merging unit 26 can be used as a first level device 34 for recording the fault event at a higher sampling rate. The IEDs are configured in this implementation as second level devices 36.

It shall be understood that waveform recording can be implemented in a separate hardware module in a modular architecture. In this case, the MU remains as first level device but can be located in separate hardware with its own communication interfaces such as but not limited to USB or Ethernet. The waveform recorder embodied as a merging unit can thus be built as a "black box", as in aircraft industries, which comes rugged and bullet proof and contains data as described in IEC 61850 logical nodes responsible for fault wave form communication across devices in the substation/distribution automation hierarchy. Further, this waveform recorder shall also listen to all network traffic related to triggering fault waveform recording, which can be useful for further analysis of faults.

Figure 4:
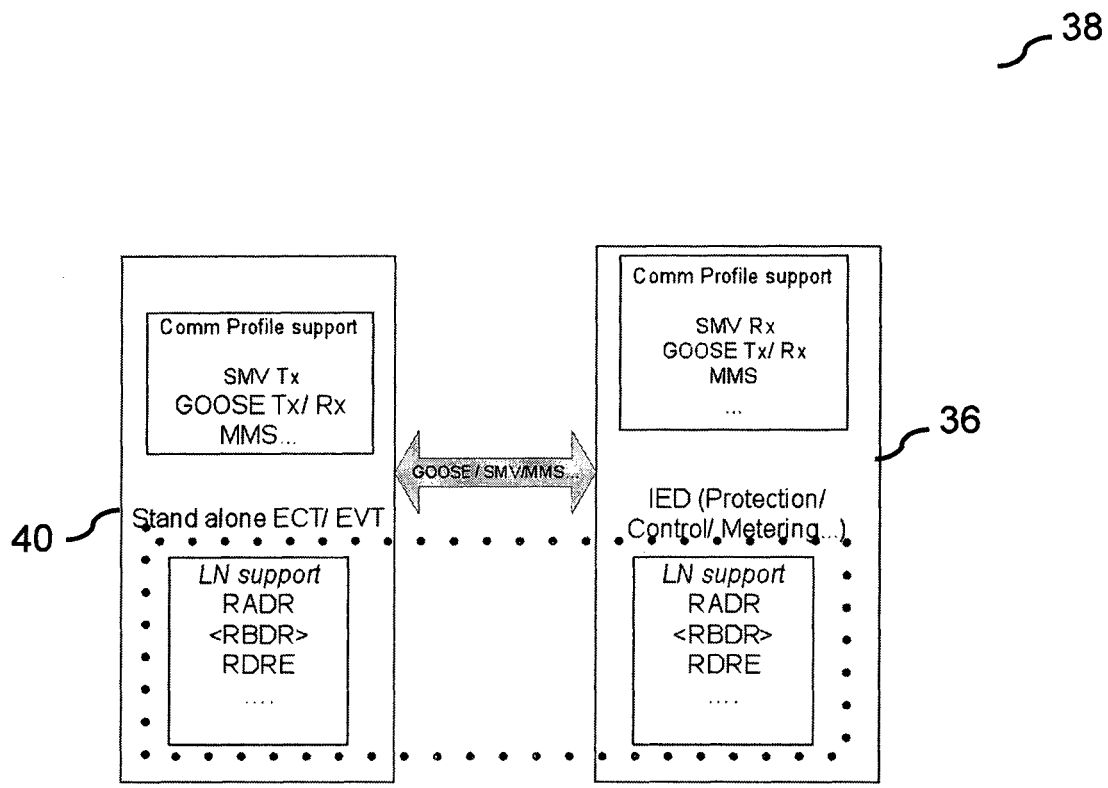
FIG. 4 illustrates a second arrangement of the power distribution system of FIG. 2 where the transformer is a first level device in accordance with an exemplary embodiment of the present disclosure.

FIG. 4 illustrates a second arrangement of the power distribution system of FIG. 2 where the transformer is a first level device in accordance with an exemplary embodiment of the present disclosure. As shown in FIG. 4, the one or more electronic transformers 22 of the power distribution system can be a first level device 40 for recording the fault event at a higher sampling rate as a first level device and the merging unit is built-in the electronics of the transformers. The IEDs are configured in this implementation as second level devices 36.

Figure 5:
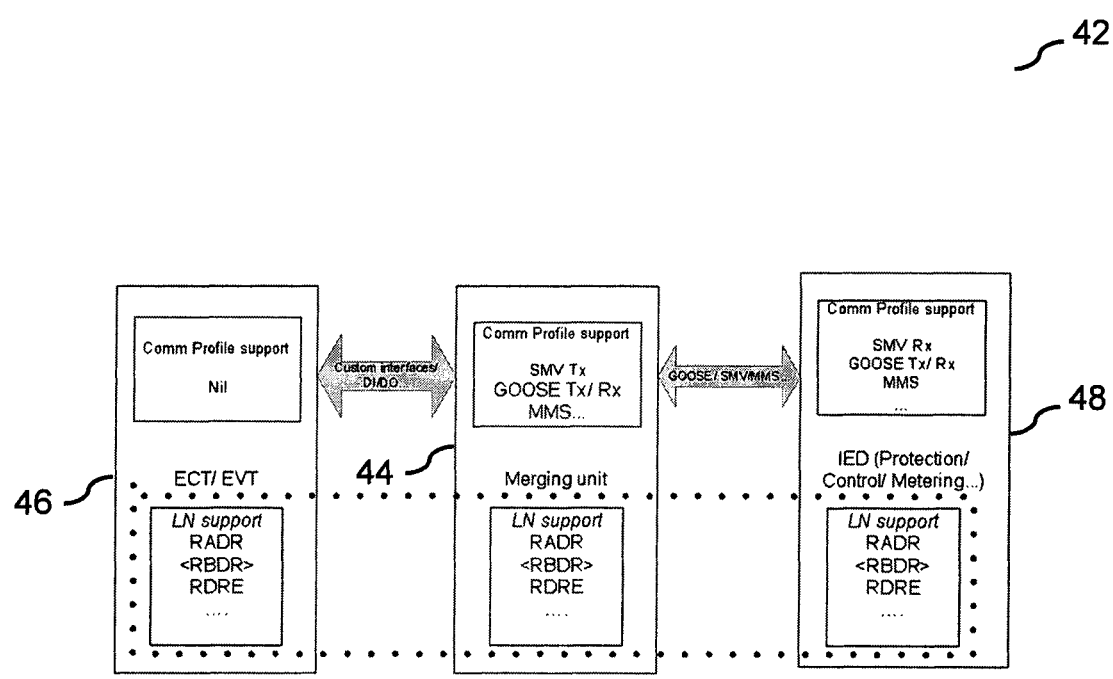
FIG. 5 illustrates a third arrangement of the power distribution system of FIG. 2 where the transformer is a first level device, and the merging unit is a second level device in accordance with an exemplary embodiment of the present disclosure.

FIG. 5 illustrates a third arrangement of the power distribution system of FIG. 2 where the transformer is a first level device, and the merging unit is a second level device in accordance with an exemplary embodiment of the present disclosure. As shown in FIG. 5, the merging unit can be configured as an additional first level device 44 for coordinating the communication between the first level device 46 and the different levels 48 in the power distribution system. In other words, the merging unit synchronizes incoming sender streams and passes on triggers from the higher level(s) to the sensors/instrument transformers, and acts as a gateway to retrieve the waveforms or fault disturbance records.

EXAMPLE

In one example according to the exemplary embodiments disclosed herein, the power distribution system architecture for effective fault analysis is based on implementing the waveform recording feature in Merging Unit and IEDs (protection, etc.,) in various levels of the power distribution system automation hierarchy using the same stream of raw data.

The Merging unit can provide a digital interface for the instrument transformers acquire sampled measured value data from the instrument transformers at a high sampling rate, and publish the sampled measured value data to the process bus network at the same and/or reduced sampling rate based on methods such as interpolation. In this arrangement, it can be advantageous to record the waveform at different levels using different devices such as can be merging unit, protection and control IEDs, DFRs, or other suitable devices based on the incoming sampling rates to these IEDs, which are in turn based on a single stream of sampled measured values from instrument transformers at 80 samples/cycle and records upon an event at the same rate. The merging unit (MU) publishes the sampled measured values at 32 samples/cycle rate onto the process bus. The protection and control IEDs receiving these reduced rate sampled measured values can record the waveform for a relatively longer duration than the merging units. Also, the protection and control IED can trigger any other devices including the merging unit (originating the sampled measured values) that makes use of the raw and/or processed sampled measured values to record the waveform upon an event.

In this example, the MU provides sample streams for protection/metering (e.g. 80 samples/cycle), containing additional function as fault recording with higher sample rates (e.g., 256 samples/cycle), with fault trigger from an secondary device (e.g., subscribing IED) coming down via GOOSE (or possibly 'slow' SV). The merging unit maintains a circular buffer which includes the information of a predefined number of samples for storing pre-fault and/or post-fault information. Since the merging unit already includes the waveform information as the first source, it can store the higher sampling rates (for example 256 samples/cycles) for a shorter duration. The subscribing second level devices receive messages in an IEC 61850-9-2 LE format or other suitable format as desired at a lesser rate (for example 80 or 32 samples/cycle) or can down sample the messages (for example 80 samples/cycle or 32 samples/cycle etc. . . . ), which can then be used for fault recording for a longer time period relative to first level device described herein above. The second level device can also be a data collector, recording device, or a PC (client computer) which subscribes to incoming messages for example IEC 61850-9-2 LE messages.

As shown in FIG. 3, the merging units or ECT/EVT and bay level IEDs shall act as first and second level recording devices respectively, when ECT/EVT can publish the field data for example voltage/current by itself through SMV (sampled and measured value) messages or other suitable format as desired.

In another example (see FIG. 5) according to exemplary embodiments described herein, the merging unit can be an additional first level device if the ECT/EVT acts as the primary waveform storage device. In this example, the MU delivers the triggers from the higher level(s) device to the sensors, and retrieves the data, for example disturbance records, from the ECT/EVT and delivers these to other IEDs at the first level (e.g., higher level devices). In this case, there are multiple possibilities for storing raw sample data and post processed streams of data storage including having all the devices involved in the process store data on sensing an event or on receiving a suitable trigger.

According to exemplary embodiments described herein time synchronization can be used with an accuracy of less than few microseconds (or better) to arrive at the sequence of events, which happen due to faults. All MUs can be synchronized to each other and the IEDs within the substations.

As can be understood from the illustrations provided in various embodiments described herein, two or more devices from the first, second or other levels participate together to detect an event for recording and for performing waveform recording. The data for the detection of event and for waveform recording are based from a single stream of sampled measured value data.

Thus, any device may be configured for waveform recording in the power distribution network based on the exemplary methods described herein such that the resources in the power distribution network are well utilized due to the flexibility of the described embodiments, and also ensure that the data for waveform recording by one or more devices are time synchronized.

The various embodiments described herein thus achieve both waveform recording and event recording with existing power distribution system infrastructure using data recording at the primary information source. As described, the exemplary embodiments provide a low cost solution enabling applications that call for different data sampling rates to have raw sample recording, processed data recorded at multiple levels, and the recording of communication history. When the merging units are incorporated as a separate hardware, black box functionality can also enabled for the substation automation devices, thereby making the power distribution system more reliable.

While only certain features of the invention have been illustrated and described herein, many modifications and changes will occur to those skilled in the art. It is, therefore, to be understood that the appended claims are intended to cover all such modifications and changes as fall within the true spirit of the invention.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A distributed waveform recording method for event monitoring in a power distribution system, wherein the power distribution system includes a plurality of devices communicatively connected in a plurality of hierarchical levels within the power distribution system, the plurality of devices including a plurality of instrument transformers along with merging units deployed as process level devices connected on a process bus within the plurality of hierarchical levels, a plurality of Intelligent Electronic Devices (IEDs) deployed as bay level devices connected on a station bus and on the process bus within the plurality of hierarchical levels, and a plurality of client computers deployed as station level devices connected on the station bus within the plurality of hierarchical levels, the distributed waveform recording method comprising:
   a) communicating, via at least one process level device, sampled measured value data on the process bus;
   b) subscribing to and processing, via one or more configured IEDs, the sampled measured value data communicated by the at least one process level device to identify an event;
   c) issuing, via at least one IED from the one or more configured IEDs and based on identification of an event or at least one client computer from the plurality of client computers, a waveform recording trigger to one or more devices among the plurality of devices in the power distribution system using a Generic Object Oriented Substation Event (GOOSE) communication or a Manufacturing Message System (MMS) communication; and
   d) performing waveform recording, via the one or more devices among the plurality of devices in the power distribution system, wherein the recording of waveforms is performed at different resolutions in different hierarchical levels of the power distribution system by the one or more devices, based on the issued waveform recording trigger,
   wherein data for identification of an event for waveform recording by the at least one IED and for waveform recording by the one or more devices are derived from the sampled measured value data communicated by the at least one process level device, and sourced from a single stream of the sampled measured value data for time synchronization.

2. The method of claim 1, wherein the waveform recording performed by the one or more devices in the power distribution system is synchronized based on a network time synchronization of the power distribution system and is based on data sourced from a single stream of sampled measured value data.

3. The method of claim 1, wherein the waveform recording is performed by at least two devices in the power distribution system and at two different sampling rate or for two different time period, respectively.

4. The method of claim 1, wherein the one or more instrument transformers is a first level device and a corresponding merging unit is an additional first level device for coordinating communication between a plurality of devices distributed throughout the plurality of hieratical levels in the power distribution system.

5. The method of claim 1, wherein at least one device from the plurality of devices in the power distribution system perform waveform recording on a detected waveform recording trigger based on a control command communication or a change in status of any digital input from peer or master devices.

6. The method of claim 1, wherein the one or more devices from the plurality of devices in the power distribution system perform waveform recording for one or more phases of a power signal based on detection of an event in the power distribution system associated with any of the phases of the power signal.

7. An apparatus for waveform recording based on a waveform trigger and communicatively connectable in any level within a plurality of hierarchical levels of a power distribution system having one or more devices communicatively connected in various levels of other hierarchical levels within the plurality of hierarchical levels, the apparatus comprising:
   a processing module that detects the waveform recording trigger from data processed internally or by the one or more devices within the plurality of hierarchical levels of the power distribution system; and
   a waveform recording module that performs waveform recording based on the detected waveform recording trigger,
   wherein the data for waveform recording and for detecting the waveform recording trigger are derived from a single stream of sampled measured value data communicated by at least one process level device.

8. The apparatus of claim 7, wherein the waveform recording data is processed for at least one of a trend analysis, wide area monitoring, simulated experimental studies and fault analysis.

9. The apparatus of claim 7, comprising:
   means for displaying the recorded waveform or analyzed results; and
   means for communicating the recorded waveform or analyzed results to a device outside of the power distribution system.

10. A power distributed system, comprising:
a plurality of devices communicatively connected in a plurality of hierarchical levels; and
at least two devices among the plurality of devices configured to detect an event for waveform recording and perform waveform recording based on the detected event, wherein the recording of waveforms is performed at different resolutions in different hierarchical levels of the power distribution system by the at least two devices,
wherein the at least two participating devices obtain data for the detection of the event for waveform recording and data for performing waveform recording derived from a single stream of sampled measured value data communicated by at least one process level device for time synchronization.

11. The power distributed system of claim 10, wherein the plurality of devices communicatively connected in the plurality of hierarchical levels includes a merging unit connected to a process bus that performs waveform recording based on an issued waveform recording trigger.

12. The method of claim 1, wherein the waveform recording performed by the one or more devices in the multiple hierarchical levels from the plurality of devices in the power distribution system includes a merging unit connected to a process bus based on the issued waveform recording trigger.

* * * * *